United States Patent
Chou et al.

(10) Patent No.: US 8,437,392 B2
(45) Date of Patent: May 7, 2013

(54) SELECTIVE REENCODING FOR GOP CONFORMITY

(75) Inventors: Peter Hungye Chou, Sunnyvale, CA (US); Gregory Kent Wallace, Palo Alto, CA (US); Sachin Agarwal, San Francisco, CA (US); Jian Lu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 2213 days.

(21) Appl. No.: 11/107,320

(22) Filed: Apr. 15, 2005

(65) Prior Publication Data

US 2006/0233245 A1 Oct. 19, 2006

(51) Int. Cl.
*H04N 7/12* (2006.01)

(52) U.S. Cl.
USPC .................................................... 375/240.12

(58) Field of Classification Search ............ 375/240.01–240.06, 240.12–240.16, 240.26
See application file for complete search history.

(56) References Cited

U.S. PATENT DOCUMENTS

| | | | |
|---|---|---|---|
| 5,033,105 A | 7/1991 | Atkinson | 382/56 |
| 5,046,119 A | 9/1991 | Hoffert et al. | 382/56 |
| 5,212,742 A | 5/1993 | Normile et al. | 382/56 |
| 5,237,397 A | 8/1993 | Mighdoll et al. | 358/13 |
| 5,241,658 A | 8/1993 | Masterson et al. | 395/162 |
| 5,267,334 A | 11/1993 | Normile et al. | 382/56 |
| 5,335,299 A | 8/1994 | Atkinson | 382/56 |
| 5,461,679 A | 10/1995 | Normile et al. | 382/304 |
| 5,684,714 A * | 11/1997 | Yogeshwar et al. | 370/521 |
| 6,016,360 A | 1/2000 | Nguyen et al. | 382/166 |
| 6,137,946 A | 10/2000 | Ando | 386/52 |
| 6,154,542 A | 11/2000 | Crandall | 380/28 |
| 6,301,428 B1 | 10/2001 | Linzer | 386/52 |
| 6,507,618 B1 | 1/2003 | Wee et al. | 375/240.16 |
| 6,573,846 B1 | 6/2003 | Trivedi et al. | 341/67 |
| 6,584,273 B1 | 6/2003 | Ashley et al. | 386/52 |
| 6,587,506 B1 * | 7/2003 | Noridomi et al. | 375/240.12 |
| 6,611,624 B1 * | 8/2003 | Zhang et al. | 382/232 |
| 6,683,911 B1 | 1/2004 | Inoue | 375/240.26 |
| 6,724,977 B1 * | 4/2004 | Linzer | 386/52 |
| 6,728,315 B2 | 4/2004 | Haskell et al. | 375/240.16 |
| 6,781,529 B1 | 8/2004 | Lin et al. | 341/106 |
| 6,795,499 B1 | 9/2004 | Kato et al. | 375/240.01 |
| 6,882,687 B2 | 4/2005 | Yamamoto | 375/240.12 |
| 6,909,743 B1 | 6/2005 | Ward et al. | 375/240.01 |

(Continued)

OTHER PUBLICATIONS

Eric Hamilton, Jian Lu, Gregory K. Wallace, and Peter Chou, Robust Single-Pass Variable Bit Rate Encoding, U.S. Appl. No. 10/811,427, filed Mar. 26, 2004, pp. 1-38.

(Continued)

*Primary Examiner* — Mehrdad Dastouri
*Assistant Examiner* — James Anderson, II
(74) *Attorney, Agent, or Firm* — Kenyon & Kenyon LLP (57) ABSTRACT

Systems and methods for editing and selectively encoding video. In general, in one implementation, the method includes generating video segments from portions of one or more video sources, at least one video source being encoded to have interframe dependencies; generating a video sequence from the video segments; scanning the generated video sequence to identify invalid interframe dependencies; and selectively reencoding portions of the generated video sequence to generate an output video sequence having valid interframe dependencies. The method may further comprise generating the output video sequence without reencoding valid portions of the video sequence. Valid portions of the video sequence may comprise portions lacking invalid interframe dependencies or buffer violations.

32 Claims, 5 Drawing Sheets

U.S. PATENT DOCUMENTS

| | | | | |
|---|---|---|---|---|
| 6,912,251 | B1 | 6/2005 | Ward et al. | 375/240 |
| 6,915,018 | B2 | 7/2005 | Tajime | 382/251 |
| 6,917,752 | B2 | 7/2005 | Ito | 386/52 |
| 6,980,594 | B2 * | 12/2005 | Wang et al. | 375/240.12 |
| 7,181,131 | B2 * | 2/2007 | Lin et al. | 386/111 |
| 7,254,175 | B2 * | 8/2007 | Hurst et al. | 375/240.01 |
| 2002/0136294 | A1 | 9/2002 | Culbert | 375/240.02 |
| 2003/0079038 | A1 | 4/2003 | Robbin et al. | 709/232 |
| 2004/0224638 | A1 | 11/2004 | Fadell et al. | 455/66.1 |
| 2004/0252397 | A1 | 12/2004 | Hodge et al. | 360/60 |
| 2004/0255338 | A1 | 12/2004 | Agnoli et al. | 725/136 |

OTHER PUBLICATIONS

Wenqing Jiang, Jian Lu, Greg Wallace, and Peter Chou, Robust Multi-Pass Variable Bit Rate Encoding, U.S. Appl. No. 10/751,345, filed Jan. 2005, pp. 1-39.

MPEG video compression technique, http://rnvs.informatik.tu-chemnitz.de/~jan/MPGE/HTML/mpeg_tech.html, [retrieved from the internet on Mar. 25, 2005], pp. 1-9.

Wayne E. Bretl and Mark Fimoff, Introduction, MPEG2 Tutorial, Introduction and Contents, Copyright 1999, posted on www.bretl.com on Jan. 15, 2000, http://www.bretl.com/mpeghtml/MPEGindex.htm, [retrieved from the internet on Mar. 25, 2005], pp. 1-5.

Background, http://www.bretl.com/mpeghtml/vcback.HTM, [retrieved from internet on Mar. 25, 2005], p. 1.

Prediction, http://www.bretl.com/mpeghtml/predic.HTM, [retrieved from internet on Mar. 25, 2005], p. 1.

Example: Coding based on clustering of pixel values, http://www.bretl.com/mpeghtml/cluster.HTM, [retrieved from internet on Mar. 25, 2005], p. 1.

Simple Differential Predictive Coding, http://www.bretl.com/mpeghtml/simpdiffHTM, [retrieved from internet on Mar. 25, 2005], p. 1.

Frame-Differential Coding, http://www.bretl.com/mpeghtml/framedif.HTM, [retrieved from internet on Mar. 25, 2005], p. 1.

Motion Compensated Prediction, http://www.bretl.com/mpeghtml/motcomp.HTM, [retrieved from internet on Mar. 25, 2005], p. 1.

Unpredictable Information, http://www.bretl.com/mpeghtml/unpredic.HTM, [retrieved from internet on Mar. 25, 2005], p. 1.

Transform Coding, http://www.bretl.com/mpeghtml/xfrmcode.HTM, [retrieved from internet on Mar. 25, 2005], p. 1.

Lossy Coding, http://www.bretl.com/mpeghtml/lossycod.HTM, [retrieved from internet on Mar. 25, 2005], pp. 1-2.

Masking, http://www.bretl.com/mpeghtml/masking.HTM, [retrieved from internet on Mar. 25, 2005], p. 1.

Variable Quantization, http://www.bretl.com/mpeghtml/varquant.HTM, [retrieved from internet on Mar. 25, 2005], p. 1.

Run-Level Coding, http://www.bretl.com/mpeghtml/runlevel.HTM, [retrieved from internet on Mar. 25, 2005], p. 1.

Lossy Coding Requirements, http://www.bretl.com/mpeghtml/lossyreq.HTM, [retrieved from internet on Mar. 25, 2005], p. 1.

Example—one-dimensional lossy system, http://www.bretl.com/mpeghtml/examld.HTM, [retrieved from internet on Mar. 25, 2005], p. 1.

MPEG 2 Video Compression, http://www.bretl.com/mpeghtml/mpeg2vc.HTM, [retrieved from internet on Mar. 25, 2005], p. 1.

Introduction to MPEG 2 Video Compression, http://www.bretl.com/mpeghtml/mpeg2vc1.HTM, [retrieved from internet on Mar. 25, 2005], pp. 1-2.

MPEG Coder/Decoder Diagram, http://www.bretl.com/mpeghtml/codecdial.HTM, [retrieved from internet on Mar. 25, 2005], pp. 1-2.

Profiles and Levels, http://www.bretl.com/mpeghtml/profiles.HTM, [retrieved from the internet on Mar. 25, 2005], pp. 1-2.

Frames, Fields, Pictures (I, P, B), http://www.bretl.com/mpeghtml/pixtypes.HTM, [retrieved from internet on Mar. 25, 2005], pp. 1-2.

I P B Picture Reordering, http://www.bretl.com/mpeghtml/reorder.HTM, [retrieved from internet on Mar. 25, 2005], p. 1.

Pixel Positioning, http://www.bretl.com/mpeghtml/pixpos.HTM, [retrieved from internet on Mar. 25, 2005], pp. 1-2.

Compression tools, http://www.bretl.com/mpeghtml/VCtools.HTM, [retrieved from internet on Mar. 25, 2005], p. 1.

MPEG 2 Quantization, http://www.bretl.com/mpeghtml/quantiz.HTM, [retrieved from internet on Mar. 25, 2005], p. 1.

MPEG 2 Prediction, http://www.bretl.com/mpeghtml/mpredic.HTM, [retrieved from internet on Mar. 25, 2005], pp. 1-2.

Discrete Cosine Transform, http://www.bretl.com/mpeghtml/DCxfrm.HTM, [retrieved from internet on Mar. 25, 2005], pp. 1-2.

Huffman/Run-Level Coding, http://www.bretl.com/mpeghtml/hufRL.HTM, [retrieved from internet on Mar. 25, 2005], pp. 1-2.

Zig-Zag Scanning Patterns, http://www.bretl.com/mpeghtml/zigzag.HTM, [retrieved from internet on Mar. 25, 2005], pp. 1-2.

MPEG 2 Video Data Structures, http://www.bretl.com/mpeghtml/vidstruc.HTM, [retrieved from internet on Mar. 25, 2005], p. 1.

MPEG 2 Data Transport, http://www.bretl.com/mpeghtml/dataxprt.HTM, [retrieved from internet on Mar. 25, 2005], p. 1.

Transport Packets, http://www.bretl.com/mpeghtml/xprtpkt.HTM, [retrieved from internet on Mar. 25, 2005], p. 1.

Transport Packet Diagram, http://www.bretl.com/mpeghtml/prtdiag.HTM, [retrieved from internet on Mar. 25, 2005], p. 1.

Transport Header, http://www.bretl.com/mpeghtml/xprthdr.HTM, [retrieved from internet on Mar. 25, 2005], p. 1.

Transport Adaptation Field, http://www.bretl.com/mpeghtml/adapfld.HTM, [retrieved from internet on Mar. 25, 2005], p. 1.

Transport Payload, http://www.bretl.com/mpeghtml/payload.HTM, [retrieved from internet on Mar. 25, 2005], p. 1.

Timing and Buffer Control, http://www.bretl.com/mpeghtml/timebuf.HTM, [retrieved from internet on Mar. 25, 2005], p. 1.

Timing Model, http://www.bretl.com/mpeghtml/timemdl.HTM, [retrieved from internet on Mar. 25, 2005], pp. 1-2.

Timing Model Diagram, http://www.bretl.com/mpeghtml/timediag.HTM, [retrieved from internet on Mar. 25, 2005], p. 1.

PCR—Program Clock Reference, http://www.bretl.com/mpeghtml/PCR.HTM, [retrieved from internet on Mar. 25, 2005], p. 1.

STC—System Time Clock, http://www.bretl.com/mpeghtml/STC.HTM, [retrieved from internet on Mar. 25, 2005], p. 1.

SCR—System Clock Reference, http://www.bretl.com/mpeghtml/SCR.HTM, [retrieved from internet on Mar. 25, 2005], p. 1.

PTS—Presentation Time Stamp, http://www.bretl.com/mpeghtml/PTS.HTM, [retrieved from internet on Mar. 25, 2005], p. 1.

DTS—Decode Time Stamp, http://www.bretl.com/mpeghtml.DTS.HTM, [retrieved from internet on Mar. 25, 2005], p. 1.

Multiplexed Programs, http://www.bretl.com/mpeghtml/mpxprog.HTM, [retrieved from internet on Mar. 25, 2005], p. 1.

VBV—Video Buffering Verifier, http://www.bretl.com/mpeghtml/VBV.HTM, [retrieved from internet on Mar. 25, 2005], p. 1.

Buffer Synchronization and Startup, http://www.bretl.com/mpeghtml/bufsync.HTM, [retrieved from internet on Mar. 25, 2005], p. 1.

Constant Bit Rate Operation, http://www.bretl.com/mpeghtml/conBR.HTM, [retrieved from internet on Mar. 25, 2005], p. 1.

Variable Bit Rate Operation, http://www.bretl.com/mpeghtml/VarBRr.HTM, [retrieved from internet on Mar. 25, 2005], p. 1.

Startup, http://www.bretl.com/mpeghtml/startbuf.HTM, [retrieved from internet on Mar. 25, 2005], p. 1.

Low Delay Mode, http://www.bretl.com/mpeghtml/lodelay.HTM, [retrieved from internet on Mar. 25, 2005], p. 1.

Decoder STC Synchronization, http://www.bretl.com/mpeghtml/STCsync.HTM, [retrieved from internet on Mar. 25, 2005], p. 1.

Synchronization Loop Model, http://www.bretl.com/mpeghtml/syncloop.HTM, [retrieved from internet on Mar. 25, 2005], pp. 1-2.

Loop Characteristics, http://www.bretl.com/mpegbtml/loopchar.HTM, [retrieved from internet on Mar. 25, 2005], pp. 1-4.

Decoder Buffer Requirements, http://www.bretl.com/mpeghtml/bufreq.HTM, [retrieved from internet on Mar. 25, 2005], pp. 1-2.

MPEG Program Specific Information (PSI), http://www.bretl.com/mpeghtml/mpegpsi.HTMm, [retrieved from internet on Mar. 25, 2005], p. 1.

ATSC Program and System Information Protocol (PSIP), http://www.bretl.com/mpeghtml/ATSCPSIP.HTM, [retrieved from internet on Mar. 25, 2005], p. 1.

ATSC Doc A/53 Constraints on MPEG, http://www.bretl.com/mpeghtml/A53spec.HTM, [retrieved from internet on Mar. 25, 2005], p. 1.

Annex A—Video Constraints, http://www.bretl.com/mpeghtml/A53A.HTM, [retrieved from internet on Mar. 25, 2005], p. 1.
Annex B—Audio System, http://www.bretl.com/mpeghtml/A53B.HTM, [retrieved from internet on Mar. 25, 2005], p. 1.
Annex C—Multiplex and Transport, http://www.bretl.com/mpeghtml/A53C.HTM, [retrieved from internet on Mar. 25, 2005], p. 1.
Annex D—RF/Transmission System, http://www.bretl.com/mpeghtml/A53D.HTM, [retrieved from internet on Mar. 25, 2005], p. 1.
Standards, http://www.bretl.com/mpeghtml/stds.HTM, [retrieved from internet on Mar. 25, 2005], p. 1.
ATSC Standards, http://www.bretl.com/mpeghtml/ATSCstds.HTM, [retrieved from internet on Mar. 25, 2005], pp. 1-2.
MPEG Standards, http://www.bretl.com/mpeghtml/MPEGstds.HTM, [retrieved from internet on Mar. 25, 2005], pp. 1-2.
MPEG 2 Video Data Structures, http://www.bretl.com/mpeghtml/vidstuc.HTM, [retrieved from internet on Mar. 25, 2005], p. 1.
Pixel, http://www.bretl.com/mpeghtml/index118.HTM, [retrieved from internet on Mar. 25, 2005], p. 1.
Block, http://www.bretl.com/mpeghtml/block.HTM, [retrieved from internet on Mar. 25, 2005], p. 1.
Macroblock, http://www.bretl.com/mpeghtml/macroblk.HTM, [retrieved from internet on Mar. 25, 2005], p. 1.
Field DCT Coding and Frame DCT Coding, http://www.bretl.com/mpeghtml/fldfrm.HTM, [retrieved from internet on Mar. 25, 2005], pp. 1-2.
Slice, http://www.bretl.com/mpeghtml/slice.HTM, [retrieved from internet on Mar. 25, 2005], p. 1.
Picture, http://www.bretl.com/mpeghtml/picture.HTM, [retrieved from internet on Mar. 25, 2005], pp. 1-2.
Group of Pictures (GOP), http://www.bretl.com/mpeghtml/GOP.HTM, [retrieved from internet on Mar. 25, 2005], p. 1.
Sequence, http://www.bretl.com/mpeghtml/sequence.HTM, [retrieved from internet on Mar. 25, 2005], p. 1.
PES Packets and Elementary Streams, http://www.bretl.com/mpeghtml/pespckt.HTM, [retrieved from internet on Mar. 25, 2005], pp. 1-2.
Glossary, http://www.bretl.com/mpeghtml/gloss.HTM, [retrieved from internet on Mar. 25, 2005], pp. 1-4.
P. N. Tudor, MPEG-2 Video Compression, Dec. 1995, http://www.bbc.co.uk/rd/pubs/papers/paper_14/paper_14.shtml, [retrieved from internet on Mar. 25, 2005], pp. 1-15.
Chad Fogg, MPEG-2 FAQ, Apr. 2, 1996, http://bmrc.berkeley.edu/research/mpeg/faq/mpeg2-v38/faq_v38.html, [retrieved from internet on Mar. 25, 2005], pp. 1-46.

* cited by examiner

SELECTIVE REENCODING FOR GOP CONFORMITY

CROSS-REFERENCE TO RELATED APPLICATIONS

The present application is related to U.S. patent application Ser. No. 11/108,157 entitled SINGLE PASS CONSTRAINED CONSTANT BIT-RATE ENCODING by Lu et al. which is commonly assigned and filed on Apr. 15, 2005, the contents of which is incorporated herein by reference in its entirety.

BACKGROUND

The following disclosure generally relates to systems and methods for editing and selectively encoding video.

A video editing application allows a user to generate an output video sequence from various video sources. A video camera can capture and encode video information that can be used as video sources. A user can make edits to create a video sequence composed of desired portions of the video sources. One type of video editing application encodes the video sources to an intermediate format prior to editing. However, this technique is time-consuming and processor-intensive on the front-end as each video source has to be processed before it can be edited. Furthermore, transforming video from one format to another causes generational quality loss. Another type of video editing application encodes an entire video sequence after editing. But this technique is time-consuming and processor-intensive on the back-end and also reduces video quality.

One family of encoding standards for video sources is the MPEG (Motion Picture Experts Group) standard, for example MPEG-2. For example, long-GOPs (Group Of Pictures) in MPEG use intraframe compression techniques to reduce the encoded size of each frame, and interframe compression techniques to reduce the encoded size of a sequence of frames. For interframe compression, MPEG video clips are segmented into GOPs that include an independent I-frame and dependent P-frames and B-frames. The P-frames and B-frames can be dependent not only on reference frames within the same GOP, but also on reference frames in a neighboring GOP. An MPEG decoder used to display MPEG video clips includes a buffer to store reference frames while decoding their dependent frames. The buffer can be subject to an overflow condition when a data rate of the MPEG video clip is too high to store necessary frames and subject to an underflow condition when a data rate is too low to keep up with a display rate.

SUMMARY

This disclosure generally describes systems and methods for editing and selectively encoding video. A proposed system can perform video editing in a native format without time-consuming and processor-intensive encoding of video sources into an intermediate editing format. The proposed system can also output video sequences conforming to, for example, the MPEG (Motion Picture Experts Group) standard or other video format having interframe dependencies (e.g., GOPs, or Group Of Pictures, such as long-GOPs) and/or buffer constraints, and the like, without reencoding a greater portion of the video segment timeline than necessary.

In general, in one aspect, a method is provided. The method comprises generating video segments from portions of one or more video sources, at least one video source being encoded to have interframe dependencies; generating a video sequence from the video segments; scanning the generated video sequence to identify invalid interframe dependencies; and selectively reencoding portions of the generated video sequence to generate an output video sequence having valid interframe dependencies.

Particular implementations can include one or more the following features. The method can further comprise generating the output video sequence without reencoding valid portions of the generated video sequence. Valid portions of the generated video sequence can comprise portions lacking invalid interframe dependencies. The at least one video source can comprise an MPEG video clip encoded to have at least one of a B-frame or a P-frame that is dependent on a source frame within the MPEG video clip, and a portion of the MPEG video clip included in the video sequence can be identified as invalid responsive to the source frame not being included in the generated video sequence. The video segment of the MPEG video clip can be reencoded to begin with a closed GOP. The method can further comprise identifying a portion of the generated video sequence as invalid if an interframe dependency relies on a video segment of the at least one video source that is not included in the generated video sequence. The portion of the invalid video sequence can begin or end mid-GOP or with an open GOP. Scanning can comprise scanning a video segment to identify invalid interframe dependencies within the video segment; and rescanning one or more adjoining video segments to identify invalid interframe dependencies outside of the video segment resulting from a reencoding of one or more of the video segments.

The method can further comprise storing a CRC representation of an encoded frame of an adjacent video segment that is conforming to a video segment that has a dependent frame; and verifying that dependency between frames remains valid by comparing the stored CRC with a current CRC of the encoded frame. The method can further comprise identifying a video segment of the generated video sequence as valid if an interframe dependency relies on a video segment of the at least one video source that is included in the generated video sequence. The video segment of the valid video sequence can comprise a closed-GOP. The method can further comprise scanning the video sequence to check the validity of buffer levels associated with decoding the generated video sequence. Scanning the video sequence to check the validity of buffer levels can comprise comparing buffer levels associated with adjoining frames on either side of a video segment boundary for continuity. Scanning the video sequence to check the validity of buffer levels can comprise ensuring that a buffer level remains above an underflow level and below an overflow level.

A video segment can comprise a subset of frames from a video source including a set of frames. Generating the video segments can change at least one of a duration of a video source or contents of the video source. The method can further comprise rendering the output video sequence.

In general, in another aspect, a method is provided. The method comprises generating a video sequence from portions of one or more video sources, at least one video source being encoded to have frames with varying data rates; receiving a buffer size; scanning the video sequence to check validity of buffer levels by comparing buffer levels associated with adjoining frames for continuity; and selectively reencoding video segments of the generated video sequence to generate an output video sequence having continuous buffer levels.

In general, in another aspect, a method is provided. The method comprises receiving one or more video sources, at least one video source being encoded to have interframe dependencies with respect to the at least one video source; generating a video sequence from video segments of one or more video sources; scanning the generated video sequence to check validity of interframe dependencies and buffer levels with respect to the generated video sequence; marking boundaries of the generated video sequence that have invalid interframe dependencies or buffer levels; selectively reencoding video segments of the video sequence to generate an output video having valid interframe dependencies with respect to the generated video sequence and having valid buffer levels.

In general, in another aspect, a computer program product, tangibly stored on a computer-readable medium, is provided. The product can include instructions operable to cause a computer system to perform a method, comprising generating video segments from portions of one or more video sources, at least one video source being encoded to have interframe dependencies; generating a video sequence from the video segments; scanning the generated video sequence to identify invalid interframe dependencies; and selectively reencoding portions of the generated video sequence to generate an output video sequence having valid interframe dependencies.

In general, in another aspect, a system is provided. The system comprises an editing timeline to facilitate generation of video segments from portions of one or more video sources, at least one video source being encoded to have interframe dependencies, the editing timeline generating a video sequence from the video segments; a selection block, in communication with the editing timeline, the selection block to identify invalid interframe dependencies; and an encoder, in communication with the selection block, the encoder to selectively reencode portions of the video sequence to generate an output video sequence having valid interframe dependencies.

Particular implementations can include one or more of the following features. The encoder can generate the output video sequence without reencoding valid portions of the generated video sequence. Valid portions of the generated video sequence can comprise portions lacking invalid interframe dependencies. The at least one video source can comprise an MPEG video clip encoded to have at least one of a B-frame or a P-frame that is dependent on a source frame within the MPEG video clip, and a portion of the MPEG video clip included in the video sequence is identified as invalid responsive to the source frame not being included in the generated video sequence. The video segment of the MPEG video clip is reencoded to begin with a closed GOP. The selection block can further comprise a GOP scanner to identify a portion of the generated video sequence as invalid if an interframe dependency relies on a video segment of the at least one video source that is not included in the generated video sequence. The portion of the invalid video sequence can begin or end mid-GOP or with an open GOP. The selection block can further comprise a GOP scanner to scan a video segment to identify invalid interframe dependencies within the video segment, and the GOP scanner can rescan one or more adjoining video segments to identify invalid interframe dependencies outside of the video segment resulting from a reencoding of one or more of the video segments.

The selection block can store a CRC representation of an encoded frame of an adjacent video segment that is conforming to a video segment that has a dependent frame, and the selection block can verify that dependency between frames remains valid by comparing the stored CRC with a current CRC of the encoded frame. The selection block can identify a video segment of the generated video sequence as valid if an interframe dependency relies on a video segment of the at least one video source that is included in the generated video sequence. The video segment of the valid video sequence can comprise a closed-GOP.

The selection block can comprise a virtual buffer to scan the video sequence to check the validity of buffer levels associated with decoding the generated video sequence. The virtual buffer can compare buffer levels associated with adjoining frames on either side of a video segment boundary for continuity. The virtual buffer can ensure that a buffer level remains above an underflow level and below an overflow level.

A video segment can include a subset of frames from a video source including a set of frames. The editing timeline can change at least one of a duration of a video source or contents of the video source. The system can further comprise a rendering engine, in communication with the selection block, the rendering engine to render the output video sequence.

DESCRIPTION OF DRAWINGS

Like reference symbols in the various drawings indicate like elements.

DETAILED DESCRIPTION

Figure 1:
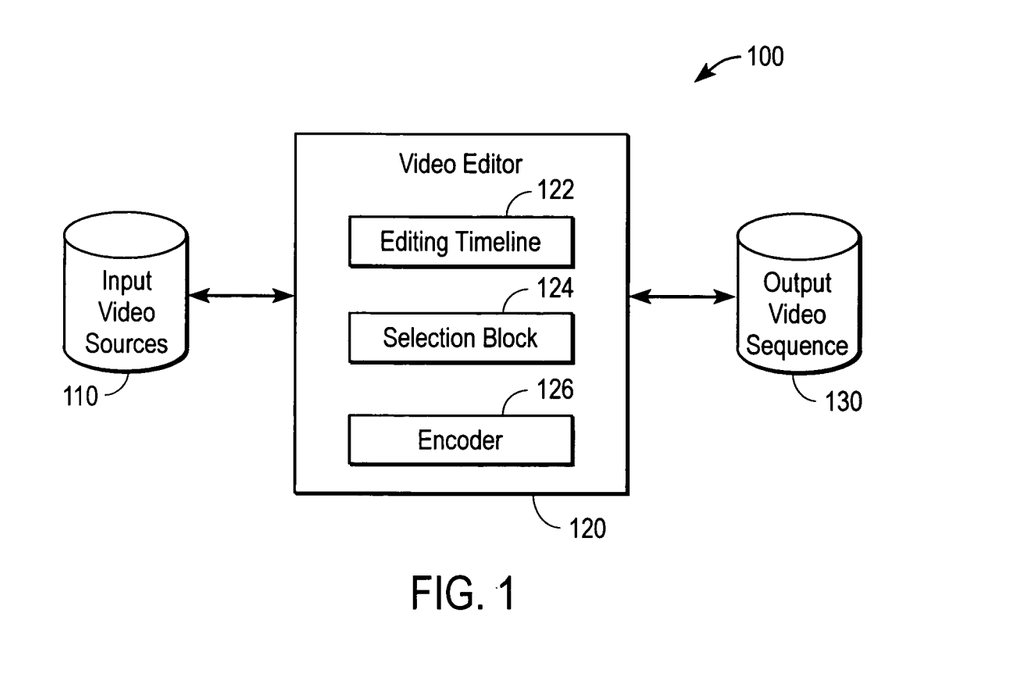
FIG. 1 is a block diagram illustrating a system to selectively reencode a video sequence.

The systems and methods described here are related to editing and selectively encoding video FIG. 1 is a block diagram illustrating a system 100 to selectively reencode a video sequence. The system 100 includes input video sources 110, a video editor 120, and an output video sequence 130. The video editor 120 further includes an editing timeline 122, a selection block 124, and an encoder 126.

The input video sources 110 can be received from a video capture, recorder, or storage device, for example, a video camera, a hard disk, a tape deck, a media archive, and the like. The input video sources 110 can be a pool of video clips available to a user that is creating the output video sequence 130. The input video sources 110 can be a series of frames storing video information in various formats such as MPEG (Motion Picture Experts Group), H.264, DV, QuickTime, and the like. In one implementation, at least one of the input video sources 110 is composed of frames having interframe dependencies. In one example of interframe dependencies, an MPEG video clip has GOPs (Groups Of Pictures) containing I-frames which are independent frames, and P-frames and B-frames which are dependent on other source frames, known as reference frames. In some implementations, GOPs are long-GOPs or GOPs with more than one P- or B-frames. In other implementations, GOPs can include just two frames (e.g., one I-frame and one B-frame or P-frame). More specifically, a P-frame is forward predicted and is dependent on the last I-frame or P-frame. A B-frame can be bi-directionally predicted and is dependent on the next and last I-frame or P-frame. A closed GOP is self-sufficient because all of its frames depend on reference frames within the same GOP. However, an open GOP has frames that depend on reference frames outside of the GOP. An example of interframe dependency is discussed below in association with FIG. 2.

The video editor 120 receives the input video sources 110. The video editor 120 can be a nonlinear video editing application such as Final Cut Pro by Apple Computer of Cupertino, Calif. The editing timeline 122 allows a user to make edits on the video sources 110 to create a video sequence. An edit trims the video sources 110 into video segments that include a portion of frames. The video segments can be moved around a timeline representing a sequence of the video segments. Additionally, an edit can change the contents of a video segment by adding an effect (e.g., dissolve, cross-fade, or color correction effects). An edit can cause the video sequence to become nonconforming in that either interframe dependency violations or buffer level violations are not in compliance with decoding standards.

The selection block 124 scans the sequence of video segments to identify and mark portions of the video sequence that need reencoding to resolve nonconformance. The encoder 126 selectively reencodes the portions of the sequence in accordance with the marked portions. Further implementations of the selection block 124 are described below in association with FIG. 4. In addition, the video editor 120 and associated methods are described in more detail below.

The output video sequence 130 is a conforming video sequence generated by the video editor 120. For example, the output video sequence 130 can be an MPEG video clip, a DVD video, and the like without interframe dependency violations or buffer level violations. In some implementations, the output video sequence 130 can include a mix of video segments having interframe dependencies that are conforming and video segments not having interframe dependencies.

Figure 2:
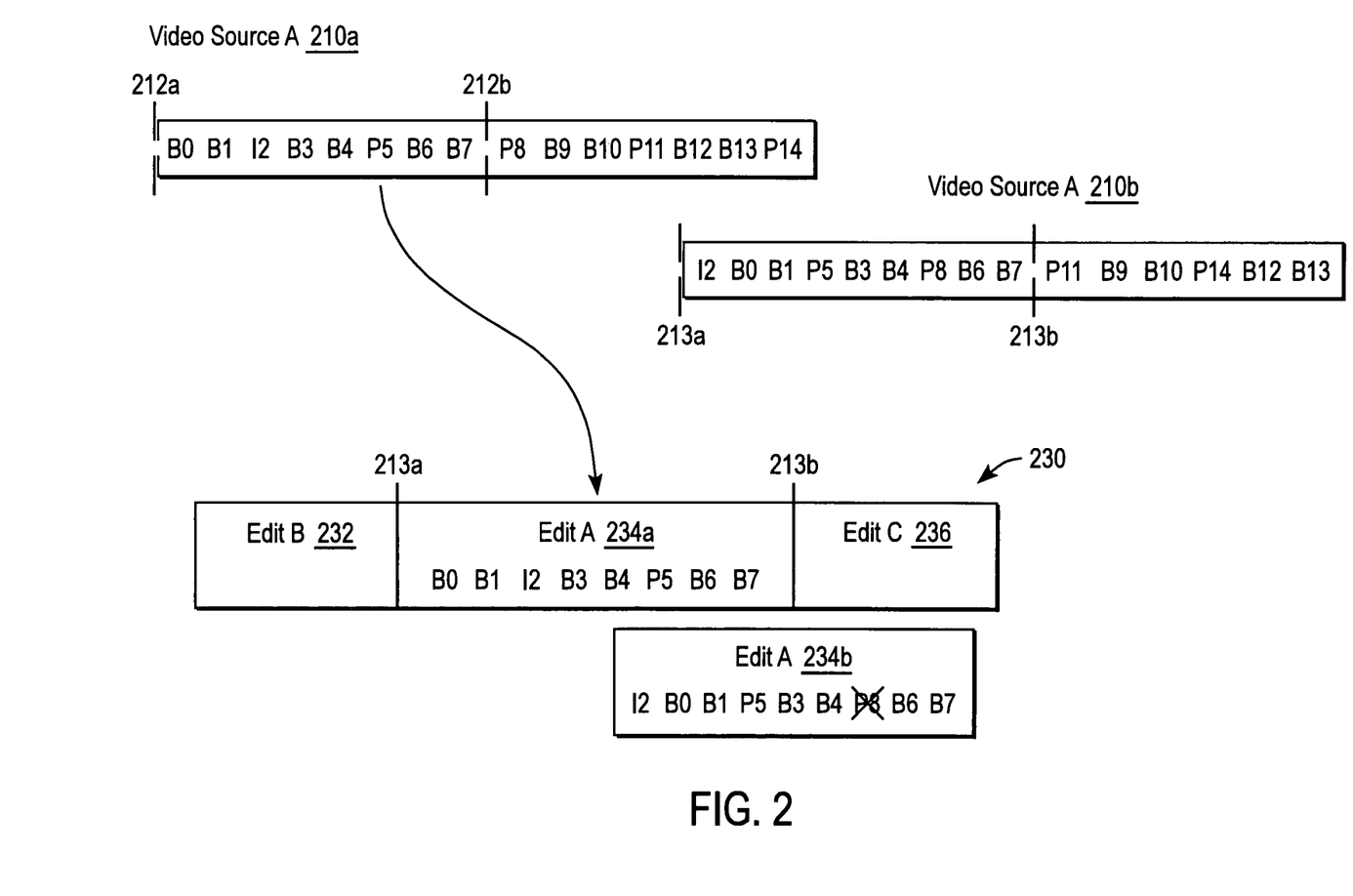
FIG. 2 is a schematic diagram illustrating examples of interframe dependencies.

FIG. 2 is a schematic diagram illustrating examples of interframe dependencies. Video source A 210a includes a set of frames in a sequential order that corresponds to how the frames are displayed (also known as display order or temporal order). Certain frames have interframe dependencies. For example, frame B6 is dependent on frame P8. Video source A 210b includes the set of frames from video source A 210a in a sequential order that corresponds to how the frames are decoded (also known as decoding order, encoding order, transmission order, or storage order). For example, because decoding frame P8 is a prerequisite for decoding frame B6, frame P8 is placed earlier in the transmission order.

An edited video sequence 230 can be generated using video segments from video source A 210a. Lines 212a and 212b represent a front boundary and a back boundary of a video segment selecting frames from video source A 210a to be included in the video sequence 230. A video segment A 234a is a portion of video source A 210 included in the video sequence 230 along with video segment B 232 and video segment C 236. Lines 213a and 213b nominally correspond to the front and back boundaries in the decode order of frames. However, video segment A 234 ends prior to frame P8 in the display order, so frame P8 should not be included in the decoding order as shown in video segment A 234b. Because frame P8 is needed to decode frame B6 but has been cut from video segment A 234, the video segment violates an interframe dependency as shown in video segment A 234b. Thus, the video segment is not valid as a conforming portion of the video sequence 230 that can be output without further reencoding.

Figure 3:
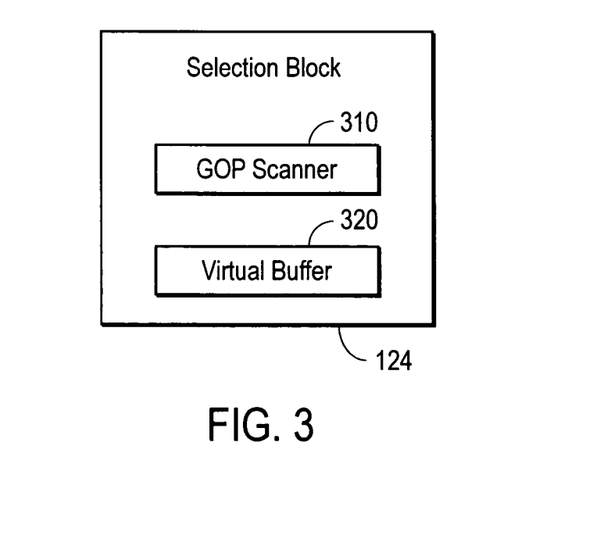
FIG. 3 is a block diagram illustrating a selection block within the system of FIG. 1.

FIG. 3 is a block diagram illustrating one implementation of the selection block 124 within the system 100 of FIG. 1. The selection block 124 includes a GOP scanner 310 and a virtual buffer 320.

The GOP scanner 310 identifies violations of interframe dependencies in an edited video sequence. For example, a video segment that begins mid-GOP and has a B-frame (a P-frame) that depends on another frame that is not part of the video segment violates the interframe dependency of the B-frame. The GOP scanner 310 examines frames in each edit, including the preceding video segment and one or more subsequent video segments following the edit. The GOP scanner 310 selects and marks portions of the edits that need reencoding to remove the interframe dependency.

In one implementation, the virtual buffer 320 identifies violations of buffer levels. The virtual buffer 320 can simulate conditions of a decode buffer by tracking a state, or current buffer level, and changes to the buffer level that occur while decoding the video sequence. By doing so, the virtual buffer 320 prevents an overflow condition where the data rate is too low or an underflow condition where the data rate is too high. A decode standard such as MPEG can provide guidelines or restrictions for setting a standard buffer size and data rate for tracking by the virtual buffer 320. In some implementations, the virtual buffer 229 can be a constrained constant bit rate buffer as described in U.S. patent application Ser. No. 11/108, 157 filed on Apr. 15, 2005.

Figure 4:
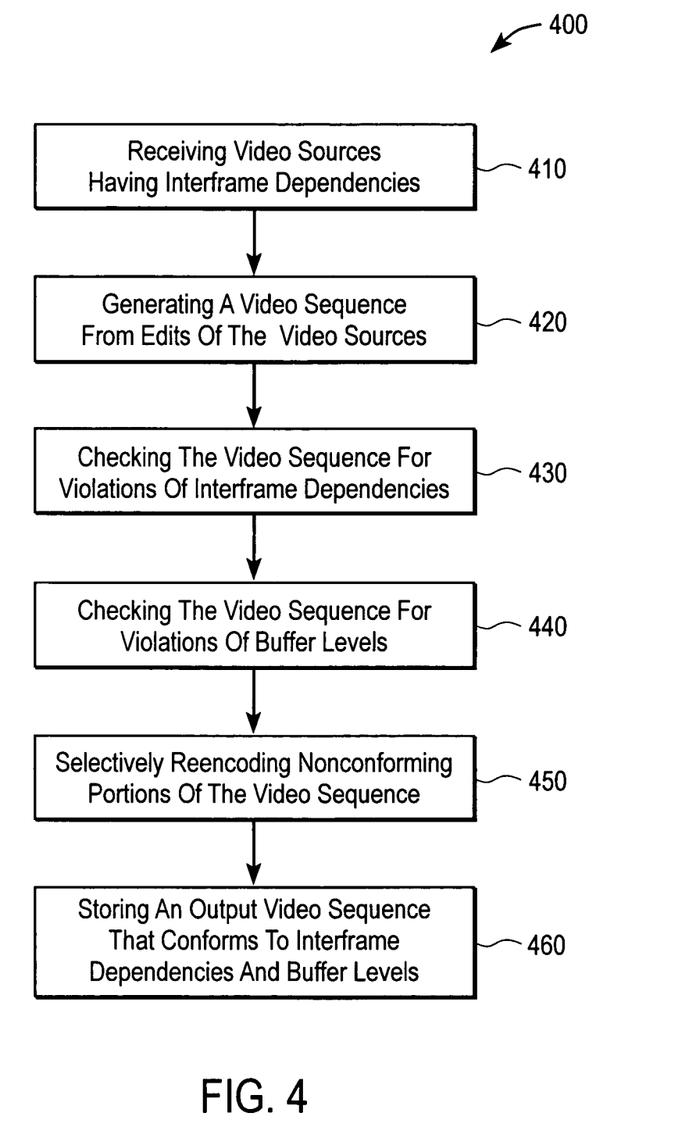
FIG. 4 is a flow diagram illustrating a method for selectively reencoding a video sequence.

FIG. 4 is a flow diagram illustrating a method 400 for video editing and encoding. Video sources are received 410 (e.g., input video sources 110). A video source can have interframe dependencies. A video sequence is generated 420 from the video sources by arranging video segments in an editing timeline and/or applying effects to portions of video segments (e.g., using the editing timeline 122). In particular, a user or automated process stitches together portions of the video sources into a desired flow. The user can drag and drop the selected video clip into the timeline and use a trimming operation to isolate a desired portion of the video clip. For example, the video segments can include a roll A of wide shots and a roll B of close ups. Rolls A and B, in one implementation, can be received from different sources and can be encoded according to different video formats. In the example, the user can select a portion of roll A for an opening shot, switch to a portion of roll B to draw attention to a subject, and then switch back to roll A for a closing shot. A user can also add effects to or across video segments such as fade, dissolve, color correction, and the like.

The video sequence is checked 430 for violations of interframe dependencies (e.g., by the GOP scanner 310). In some implementations, a front boundary of the video segment is checked for violations and selected frames are marked for reencoding. Also, a back boundary of the video segment is checked and marked. Video segments that begin with a closed GOP on the front boundary and end with a complete GOP on a back boundary, do not violate interframe dependencies. However, video segments that begin with an open GOP, or begin or end mid-GOP, need to be checked for dependency violations, such as when a frame outside of the video segment is needed to decode frames inside of the edit. In an open GOP, B-frames can reference a preceding GOP and are thus susceptible to dependency violations. In a video segment that begins or ends mid-GOP, an edit cuts a GOP such that part of the GOP is included in the video segment and part of the GOP is not included, and can thereby cause dependency violations. Scanning can use a window that allows several frames to be examined at the same time. By looking back in the window, a preceding video segment can be checked to ensure that its back boundary remains consistent given any changes in the front boundary of the succeeding video segment. By looking forward in the window, the succeeding video segment can be checked to ensure that its front boundary remains consistent. As a result of interframe dependency violations either within a video segment or across adjoining video segments, selected frames are marked for reencoding. Further details associated with a method for checking for violations of interframe dependencies are discussed below with respect to FIG. 5.

Adjoining video segments are checked 440 for violations of buffer levels (e.g., by the virtual buffer 320). A video segment that is in compliance with interframe dependencies can nonetheless be out of compliance with respect to buffer levels. A buffer level value (e.g., derived from vbv_delay in MPEG) associated with frames on either side of a cut can be compared. If the values are substantially equal, there is no buffer violation and the portion of the video segment is conforming. Otherwise, the portion can be marked for reencoding to prevent drift in an associated decoding buffer. In one implementation, the video sequence can be checked for violations of interframe dependencies and for violations of buffer levels during a single scan. In another implementation, the checks can be during separate scans.

Portions of the video sequence are selectively reencoded 450 to conform violations (e.g., by the encoder 126). To correct interframe dependency violations, selected frames of the video sequence can be converted to be independent (e.g., converted to begin with a closed GOP and end with a complete GOP). Alternatively, selected portions of the video sequence can be converted such that any cross-boundary dependencies are conforming (e.g., a P-frame of one edited video segment can be generated to properly depend on an I-frame in a preceding edited video segment). As a result, P-frames and B-frames of an MPEG portion refer to an I-frame within the GOP. To correct buffer violations, a marked portion can be forced to buffer levels associated with conforming portions on its front and back boundaries. In other words, the data rate of the portion is adjusted in accordance with the desired buffer levels. For example, frames can be more lightly compressed to cause a fall in the buffer level. In another example, frames can be more heavily compressed to cause a rise in the buffer level. Further details associated with a method for checking for violations of buffer levels are discussed below with respect to FIG. 6.

The output video sequence is stored 460 (e.g., the output video sequence 130). For example, the output video sequence can be output to be stored as a digital stream in an MPEG camera or deck, burned to DVD, decoded for display, transmitted over a network, and the like.

Figure 5:
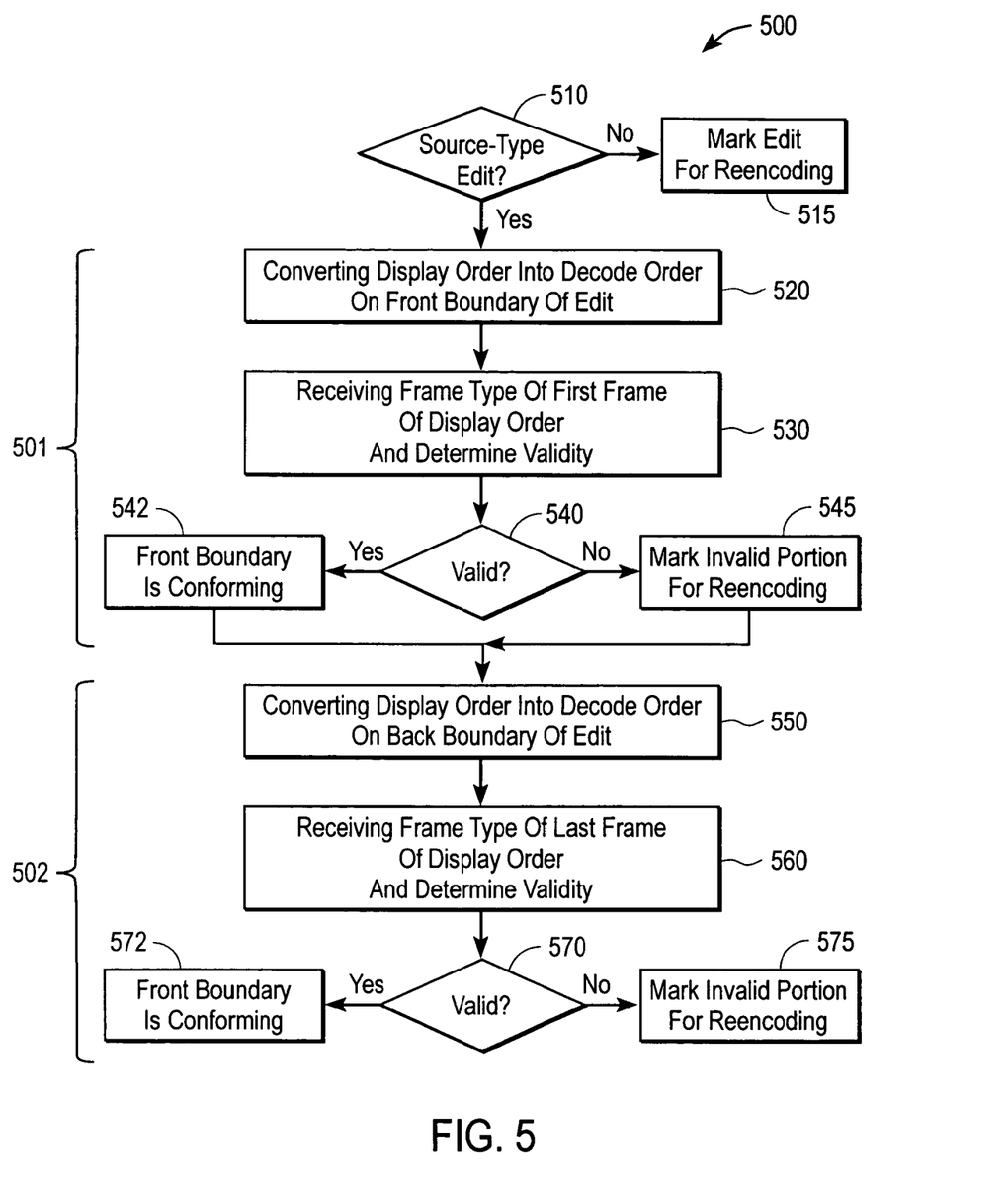
FIG. 5 is a flow diagram illustrating a method for identifying violations of interframe dependencies.

FIG. 5 is a flow diagram illustrating one implementation of a method 430 for identifying violations of interframe dependencies. As described, a video sequence can have violations due to edits on video segments. At a high-level, portions of the video sequence are marked as valid if there are no interframe dependency or buffer violations and no reencoding is needed. On the other hand, portions of the video sequence are marked as invalid if there are interframe dependency violations and reencoding boundaries are determined.

In one implementation, a threshold determination 510 is whether the video segment is a source-type. A source video segment is potentially valid because the content within frames of the video source are unaltered (trimming an input video source alters durations, not contents). A video segment is not a source video segment when the contents are changed by, for example, adding an effect (e.g., dissolve, cross-fade, color correction) to the source video segment to change the frame contents. The video segment is marked 515 for reencoding. In some implementations, just the portion of the video segment containing the effect is not of source-type, allowing validity to be checked on a remaining portion of the edit.

The front boundary of the portion is checked and marked 501. To do so, a display order of the frames on the front boundary are converted 520 into a decode order. A frame type of the first frame of the display order is received 530 and a validity is determined 540 based on the frame type. If the first frame of display is an I-frame, the video is valid if the display order and the decode order are substantially the same. If the first frame of display is a P-frame, the portion is invalid because a corresponding I-frame is sourced from outside of (i.e., prior to) the portion. If the first frame of display is a B-frame, the portion is valid if that B-frame is the first displayed frame of a closed GOP, and its reference frame is contained in the video segment. If the portion begins with an open GOP, it is valid if the P-frame of the preceding portion is available for use as a reference (can confirm by checking a CRC as described below). A valid front boundary is conforming and need not be reencoded 542.

An invalid front boundary is marked 545 for reencoding. In some implementations, a minimum window length to the right of the front boundary is marked for reencoding (e.g., 15 frames). The minimum window length allows buffer constraints to be met without a reduction in video quality. The window length can also be computed dynamically so that the buffer constraints can be met without a reduction in video quality, and without reencoding more frames than necessary. Frames in the current GOP are marked for reencoding up to a next GOP boundary following the minimum window length if the next GOP falls within the current video segment. The next GOP may need reencoding if it is an open GOP having dependencies in the current GOP. To make this determination, a sourced frame from the current GOP can be tested for validity as a reference frame to the next GOP. The reference is invalid, for example, if a user has changed the portion to a different video source or if the portion has been reencoded (i.e.,. different GOP). In one implementation, a CRC value of the sourced frame is stored in association with the current GOP at an earlier point in time. A new CRC value can be compared against the stored CRC value to determine whether the open GOP is referring to the same reference frame. If the values are equal, the next GOP need not be reencoded. Relevant CRCs can be checked to determine validity of the source frames in the preceding GOP.

The back boundary of the video segment is checked and marked 502. Similar to the process concerning the front boundary, a display order of frames on the back boundary is converted 550 into a decode order. A frame type of the last frame of the display order is received 560 and a validity is determined 570 based on the frame type. If the last frame of display is an I-frame, the video segment is valid if all depending B-frames that precede the I-frame in display order lie within the segment (front boundary display time is less than or equal to the decode time of the I-frame). If the video segment ends with a P-frame, and the beginning of the GOP is contained within the segment, the video segment is valid. If the last frame of display is a B-frame, the portion is invalid since the forward reference frame is not included in the edit. Additional back boundary markings can result from a front boundary check of the following edit. For example, the current frame can cause an interframe dependency violation of the following video segment for dependent frames that source a frame from the current GOP. If the next segment begins on an open GOP boundary, it is valid only if the current GOP ends with a frame that is available for use as a reference (e.g., by checking a CRC as described below). A valid back boundary is conforming and need not be reencoded 572.

An invalid back boundary is marked 575 for reencoding. In some implementations, a minimum reencoding length depends on the following edit. For example, if the following video segment does not need reencoding, a minimum window length back in the preceding GOP to the left of the back boundary is marked for reencoding. In another example, if the following video segment does need reencoding and its length is not known, half of a minimum window length back in the preceding GOP to the left of the back boundary is marked for reencoding. If the following video segment does need reencoding and the length is known, a shortened or zero length window can be used accordingly. The portion in the current GOP is marked for reencoding back to the preceding GOP before the minimum window length if the preceding GOP falls within the current edit.

Figure 6:
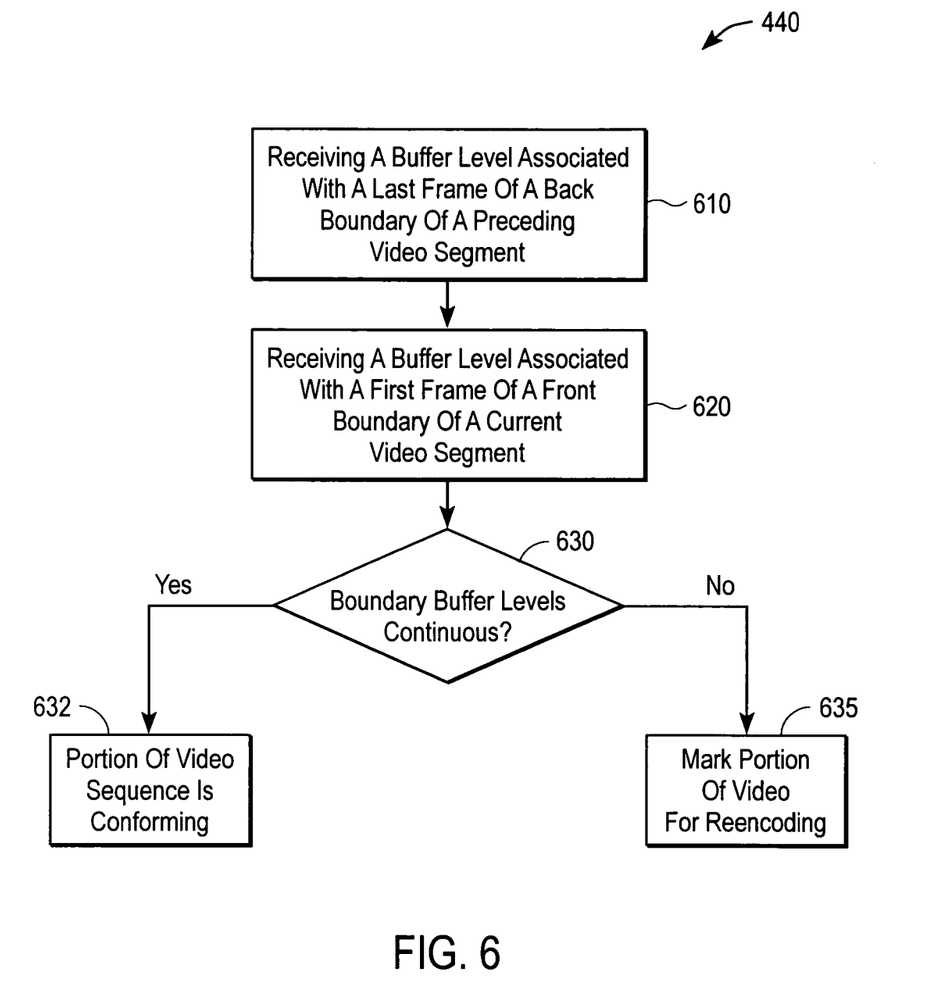
FIG. 6 is a flow diagram illustrating a method for identifying violations of buffer levels.

FIG. 6 is a flow diagram illustrating one implementation of a method 440 for identifying violations of buffer levels. A buffer level is received 610 from a last frame in a decode order at a back boundary preceding an video segment or edit marked for reencoding. A buffer level is received 620 from a first frame in decode order at a front boundary of a current video segment or edit. The boundary buffer levels are compared for continuity 630. If the front or back boundary levels are continuous, reencoding is not necessary 632. If the boundary levels are not continuous, there is a buffer violation and frames at the boundary are marked for reencoding 635. After reencoding, the buffer levels across the edits are substantially continuous and thereby prevent overflow or underflow conditions in an associated decode buffer.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., a data server), a middleware component (e.g., an application server), and a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), a personal area network ("PAN"), a mobile communication network, and/or the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Portions of this disclosure discuss video editing and selectively encoding video. The logic flows depicted in FIGS. 4-6 do not require the particular order shown, or sequential order, to achieve desirable results. For example, checking for violations of interframe dependencies and checking for buffer levels may be performed at many different places within the overall process, in one scan or multiple scans. In certain implementations, multitasking and parallel processing may be preferable.

Other embodiments may be within the scope of the following claims.

What is claimed is:
1. A computer implemented method for generating a valid output video sequence, the method comprising performing the following by operation of one or more processors:
   generating video segments from portions of one or more video sources, at least one video source being encoded to have interframe dependencies;
   generating a video sequence from the video segments;
   scanning the generated video sequence to identify invalid interframe dependencies, the invalid interframe dependencies including at least one dependent frame dependent on a reference frame external to the video sequence, the reference frame included in the one or more video sources;
   determining a window of adjoining frames on either side of a boundary of one of the video segments to selectively reencode certain frames within the window, the window determined based on a validity of buffer levels associated with decoding the video sequence, wherein determining a window of adjoining frames includes:
      storing a cyclic redundancy check (CRC) representation of a reencoded frame of a first of the video segments that is adjacent to a second of the video segments that has a frame dependent on the reencoded frame;
      verifying that dependency between the reencoded frame and the frame dependent on the reencoded frame remains valid by comparing the stored CRC with a current CRC of the reencoded frame; and
      marking the frame dependent on the reencoded frame for reencoding if the stored CRC does not match the current CRC; and selectively reencoding certain frames within the window to generate an output video sequence having valid interframe dependencies, wherein the certain frames include the at least one dependent frame of the video sequence.

2. The method of claim 1, further comprising:
generating the output video sequence without reencoding valid portions of the generated video sequence.

3. The method of claim 2, wherein valid portions of the generated video sequence comprise portions lacking invalid interframe dependencies.

4. The method of claim 1, wherein the at least one video source comprises an MPEG video clip encoded to have at least one of a B-frame or a P-frame that is dependent on a source frame within the MPEG video clip, and a portion of the MPEG video clip included in the video sequence is identified as invalid responsive to the source frame not being included in the generated video sequence.

5. The method of claim 4, wherein the video segment of the MPEG video clip is reencoded to begin with a closed GOP.

6. The method of claim 1, wherein the video segment of the video sequence containing the at least one dependent frame begins or ends mid-GOP or with an open GOP.

7. The method of claim 1, wherein scanning comprises:
scanning a video segment to identify invalid interframe dependencies within the video segment; and
rescanning one or more adjoining video segments to identify invalid interframe dependencies outside of the video segment resulting from a reencoding of one or more of the video segments.

8. The method of claim 1, further comprising:
identifying a video segment of the generated video sequence as valid if an interframe dependency relies on a video segment of the at least one video source that is included in the generated video sequence.

9. The method of claim 8, wherein the video segment of the valid video sequence comprises a closed-GOP.

10. The method of claim 1, further comprising:
scanning the video sequence to check the validity of buffer levels associated with decoding the generated video sequence.

11. The method of claim 10, where scanning the video sequence to check the validity of buffer levels comprises:
comparing buffer levels associated with adjoining frames on either side of a video segment boundary for continuity.

12. The method of claim 10, where scanning the video sequence to check the validity of buffer levels comprises:
ensuring that a buffer level remains above an underflow level and below an overflow level.

13. The method of claim 1, wherein a video segment comprises a subset of frames from a video source including a set of frames.

14. The method of claim 1, wherein generating the video segments changes at least one of a duration of a video source or contents of the video source.

15. The method of claim 1, further comprising:
rendering the output video sequence.

16. A computer implemented method for generating a valid output video sequence, the method comprising performing the following by operation of one or more processors:
receiving one or more video sources, at least one video source being encoded to have interframe dependencies with respect to the at least one video source;
generating a video sequence from video segments of one or more video sources,
scanning the generated video sequence to identify invalid interframe dependencies and invalid buffer levels with respect to the generated video sequence, the invalid interframe dependencies including at least one dependent frame dependent on a reference frame external to the video sequence, the reference frame included in the one or more video sources;
determining a window of adjoining frames on either side of a boundary of one of the video segments to selectively reencode certain frames within the window, the window determined based on a validity of buffer levels associated with decoding the video sequence;
marking boundaries of the window in the generated video sequence, wherein marking boundaries of the window includes:
storing a cyclic redundancy check (CRC) representation of a reencoded frame of a first of the video segments that is adjacent to a second of the video segments that has a frame dependent on the reencoded frame;
verifying that dependency between the reencoded frame and the frame dependent on the reencoded frame remains valid by comparing the stored CRC with a current CRC of the reencoded frame; and
marking the frame dependent on the reencoded frame for reencoding if the stored CRC does not match the current CRC; and
selectively reencoding certain frames within the marked boundaries to generate an output video having valid interframe dependencies with respect to the generated video sequence and having valid buffer levels, wherein the certain frames include the at least one dependent frame of the video sequence.

17. A computer program product, tangibly stored on a non-transitory computer-readable medium, the product including instructions operable to cause a computer system to perform a method, comprising: generating video segments from portions of one or more video sources, at least one video source being encoded to have interframe dependencies; generating a video sequence from the video segments; scanning the generated video sequence to identify invalid interframe dependencies, the invalid interframe dependencies including at least one dependent frame dependent on a reference frame external to the video sequence, the reference frame included in the one or more video sources; determining a window of adjoining frames on either side of a boundary of one of the video segments to selectively reencode certain frames within the window, the window determined based on a validity of buffer levels associated with decoding the video sequence, wherein determining a window of adjoining frames includes: storing a cyclic redundancy check (CRC) representation of a reencoded frame of a first of the video segments that is adjacent to a second of the video segments that has a frame dependent on the reencoded frame; verifying that dependency between the reencoded frame and the frame dependent on the reencoded frame remains valid by comparing the stored CRC with a current CRC of the reencoded frame; and marking the frame dependent on the reencoded frame for reencoding if the stored CRC does not match the current CRC; and selectively reencoding certain frames within the window to generate an output video sequence having valid interframe dependencies, wherein the certain frames include the at least one dependent frame of the video sequence.

18. A system, comprising:
an editing timeline module to facilitate generation of video segments from portions of one or more video sources, at least one video source being encoded to have interframe dependencies, the editing timeline module generating a video sequence from the video segments;

a selection block, in communication with the editing timeline, the selection block to identify invalid interframe dependencies, the invalid interframe dependencies including at least one dependent frame dependent on a reference frame external to the video sequence, the reference frame included in the one or more video sources; and an encoder, in communication with the selection block, the encoder to:

determine a window of adjoining frames on either side of a boundary of one of the video segments to selectively reencode certain frames within the window, the window determined based on a validity of buffer levels associated with decoding the video sequence, wherein determining a window of adjoining frames includes:

store a cyclic redundancy check (CRC) representation of a reencoded frame of a first of the video segments that is adjacent to a second of the video segments that has a frame dependent on the reencoded frame;

verify that dependency between the reencoded frame and the frame dependent on the reencoded frame remains valid by comparing the stored CRC with a current CRC of the reencoded frame; and mark the frame dependent on the reencoded frame for reencoding if the stored CRC does not match the current CRC; and selectively reencode certain frames within the window to generate an output video sequence having valid interframe dependencies, wherein the certain frames include the at least one dependent frame of the video sequence.

19. The system of claim 18, wherein the encoder generates the output video sequence without reencoding valid portions of the generated video sequence.

20. The system of claim 19, wherein valid portions of the generated video sequence comprise portions lacking invalid interframe dependencies.

21. The system of claim 18, wherein the at least one video source comprises an MPEG video clip encoded to have at least one of a B-frame or a P-frame that is dependent on a source frame within the MPEG video clip, and a portion of the MPEG video clip included in the video sequence is identified as invalid responsive to the source frame not being included in the generated video sequence.

22. The system of claim 18, wherein the video segment of the MPEG video clip is reencoded to begin with a closed GOP.

23. The system of claim 18, wherein the video segment of the video sequence containing the at least one dependent frame begins or ends mid-GOP or with an open GOP.

24. The system of claim 18, wherein the selection block further comprises:

a GOP scanner to scan a video segment to identify invalid interframe dependencies within the video segment, the GOP scanner to rescan one or more adjoining video segments to identify invalid interframe dependencies outside of the video segment resulting from a reencoding of one or more of the video segments.

25. The system of claim 18, wherein the selection block identifies a video segment of the generated video sequence as valid if an interframe dependency relies on a video segment of the at least one video source that is included in the generated video sequence.

26. The system of claim 25, wherein the video segment of the valid video sequence comprises a closed-GOP.

27. The system of claim 18, wherein the selection block comprises:

a virtual buffer to scan the video sequence to check the validity of buffer levels associated with decoding the generated video sequence.

28. The system of claim 27 wherein the virtual buffer compares buffer levels associated with adjoining frames on either side of a video segment boundary for continuity.

29. The system of claim 27, wherein the virtual buffer ensures that a buffer level remains above an underflow level and below an overflow level.

30. The system of claim 18, wherein a video segment includes a subset of frames from a video source including a set of frames.

31. The system of claim 18, wherein the editing timeline module changes at least one of a duration of a video source or contents of the video source.

32. The system of claim 18, further comprising:

a rendering engine, in communication with the selection block, the rendering engine to render the output video sequence.

* * * * *